United States Patent [19]

Dabbs

[11] Patent Number: 5,189,425
[45] Date of Patent: * Feb. 23, 1993

[54] METHOD AND APPARATUS FOR MONITORING VEHICULAR TRAFFIC

[76] Inventor: John W. T. Dabbs, 115 Claymore La., Oak Ridge, Tenn. 37830-7675

[*] Notice: The portion of the term of this patent subsequent to Dec. 24, 2008 has been disclaimed.

[21] Appl. No.: 763,850

[22] Filed: Sep. 23, 1991

Related U.S. Application Data

[63] Continuation-in-part of Ser. No. 583,560, Sep. 14, 1990, Pat. No. 5,075,680.

[51] Int. Cl.$^5$ .................. G01S 13/86; G01S 13/91; G08G 5/00; H01Q 1/00
[52] U.S. Cl. .................................... 342/52; 342/36; 367/124; 343/720; 343/781 CA; 340/952
[58] Field of Search ................... 367/124, 129; 342/52, 342/36; 343/781 CA, 720; 340/952

[56] References Cited

U.S. PATENT DOCUMENTS

| | | |
|---|---|---|
| 2,539,593 | 1/1951 | Hines . |
| 2,636,125 | 4/1953 | Southworth . |
| 2,756,424 | 4/1956 | Lewis et al. . |
| 3,181,150 | 4/1965 | Ruppersberg et al. . |
| 3,475,721 | 10/1969 | Cappel, Jr. et al. ............ 367/129 |
| 3,514,781 | 5/1970 | Ferris et al. . |
| 3,838,421 | 9/1974 | Dasse Hartaut et al. . |
| 3,844,175 | 10/1974 | Hixson . |
| 4,322,828 | 3/1982 | Hoff et al. ...................... 367/118 |
| 4,635,058 | 1/1987 | Sutphin, Jr. . |
| 4,788,555 | 11/1988 | Schultz et al. . |
| 4,811,308 | 3/1989 | Michel ............................ 367/136 |
| 4,866,454 | 9/1989 | Droessler et al. . |
| 4,885,725 | 12/1989 | McCarthy et al. ............. 367/129 |
| 5,075,680 | 12/1991 | Dabbs ............................. 342/52 |

Primary Examiner—Gilberto Barrón, Jr.
Attorney, Agent, or Firm—Luedeka, Hodges, Neely & Graham

[57] ABSTRACT

A method and apparatus for monitoring moving vehicular traffic, especially adapted for the detailed profiling and counting of airport usage by aircraft employing Doppler radar and sound generated by target aircraft. A primary parabolic reflector operated in the Cassegrainian mode with respect to Doppler radar radiation, employed in combination with a hyperbolic sub-reflector constructed so that it will reflect the radar radiation but remain transparent to sound waves is used to propagate and receive radar radiation, and to receive sound waves emanating from a target aircraft. Sound waves emanating from the target are received by the parabolic reflector and directed toward the parabolic reflector's primary focus where they strike a microphone placed at the primary focus of such reflector. The signal from the microphone and the information from the Doppler radar unit are processed by a central processing unit to provide a variety of information relating to the target aircraft. In addition, a microphone array provides angular information about a target aircraft's operations so that aircraft using a cross-runway may be eliminated from a use total for a target runway or a second array may be added to track a target's position.

23 Claims, 7 Drawing Sheets

METHOD AND APPARATUS FOR MONITORING VEHICULAR TRAFFIC

RELATED APPLICATIONS

This invention is a continuation in part of the invention contained in the co-pending application identified by Ser. No. 07/583,560 filed Sep. 14, 1990 now U.S. Pat. No. 5,075,680.

FIELD OF THE INVENTION

This invention relates to the monitoring of moving vehicles, and, more specifically, the detecting, counting and other analysis of air traffic operating at airports without control towers.

BACKGROUND OF THE INVENTION

Federal and state regulations, for a variety of reasons, require that traffic information from airports without control towers be provided. Such information is useful in allocating funds, determining traffic use patterns, law enforcement, noise control, etc.

To date, there have been two primary methods for determining traffic at such airports, namely: (1) estimation of the traffic by the airport manager or (2) spot checking the traffic for a period of time. Both such methods have inherent drawbacks. First, if the information gathered is to be used to decide the allocation of funding, which is in turn dependent upon the volume of traffic, airport managers are not likely to want to deprive their airports of funds and may be prompted to provide the highest possible estimation of air traffic using their airport. Second, human surveyors of aircraft traffic at isolated airports are subject to distraction and inattention to their task, partly due to boredom. Also, human surveyors are commonly used for only "spot checking" which is inherently inconsistent and introduces error when the survey results are extrapolated to provide some type of total traffic count.

For spot checking over longer periods, or for continuous use, "automatic" counting devices such as those used on highways to count traffic can determine the total number of airplanes using a particular runway. Such devices, such as a "road-tube" laid across a taxiway at an airport where traffic is to be counted to record the event every time a vehicle runs over the road tube, include several drawbacks such as (1) aircraft land at a variety of positions on the runway and it may be that not every aircraft would run over the cable and (2) such simple counting methods provide only the total number of vehicles running over the road tube and provide no information as to the type of use the vehicle was making of the airport nor whether the vehicle was an automobile or an aircraft. Information such as, did the aircraft land, take off, or shoot a touch and go, directional information, and type of aircraft are not obtainable by such devices but such information is helpful in describing the overall traffic usage pattern at a particular airport.

Another "automatic" airport traffic monitoring device, which has been used for a number of years, comprises a recording device box, a cable, a battery, and a microphone located to one side of, and near the middle of, a runway. Particularly loud sounds, such as from an airplane taking off, trigger a sound recording device, such as a cassette tape recorder, which records a segment of tape for a period of a few seconds; an electromechanical counter is also advanced by one count. Hourly and semi-daily "beeps" are also recorded on the tape. The analysis of the airport traffic is accomplished by a person, trained in the art, who listens to the sound segments and decides whether it was an aircraft, with some information about aircraft type based on the quality of the sound. Barking dogs and fire engines are easily eliminated. The method requires extremely close attention because the sound segments are very close together in time, leading to fatigue and boredom for the sound interpreter.

The traffic analyzing device of the previously referenced application is capable of performing the desired monitoring, but was designed primarily for use at single runway airports. However, if used at a multi runway airport with one or more runways intersecting the runway to be monitored, spurious counts could be generated as a aircraft using the cross-runway past the intersection with the primary runway. The apparatus of this application is able to detect cross-runway use and exclude such use from the data taken with respect to the target runway through use of a multiple microphone array. In addition, if more positional information is required a system of two arrays may be used to track a target.

SUMMARY OF THE INVENTION

In accordance with the present invention, a substantial variety of information is gathered relating to the aircraft traffic especially at unattended airports, that is, at airports which either have no control tower or the like, or which have a tower that is unmanned at certain hours and/or days. The present apparatus operates automatically in a "stand alone" (i.e. unattended) mode and comprises a unique combination for simultaneously collecting radar and sound radiation from a target aircraft, including a primary parabolic reflector operated in the Cassegrainian mode having a central aperture through which there extends a Doppler radar horn which directs radar radiation toward the focus of the primary parabolic reflector, a hyperbolic sub-reflector that is spaced apart from the primary reflector and oriented with its center located in line with the focus of the primary parabolic reflector, and its curvature extending in the same general direction as the curvature of the primary reflector, a microphone located at the focus of the primary parabolic reflector, means for detecting reflected doppler-shifted radar radiation from moving target aircraft, and means for analyzing both the detected sound and reflected doppler-shifted microwave radiations to provide useful information. By design, the hyperbolic sub-reflector is made transparent to sound waves, but reflective of radar radiation such that its reverse surface serves to direct radar radiation from the radar horn rearwardly to the primary parabolic reflector, thence outwardly in a collimated beam toward the target area, and simultaneously to direct radar radiation reflected from the target aircraft to the primary parabolic reflector, thence to the reverse surface of the hyperbolic sub-reflector, thence back into the horn for detection of such reflected radiation. Analysis of the detected sound and the reflected radiation provides the basis for determining valuable information relating to the aircraft traffic, such as, a count of events (takeoffs, landings, etc.) and/or the speed, direction, frequencies of engine noise, volume of engine noise, and other information relating to the target aircraft.

In accordance with the method of the present invention, there is generated radar radiation that is directed outwardly toward a target area, but which is intercepted by the reverse surface of a hyperbolic sub-reflector and reversely reflected to a primary parabolic reflector from which the radiation is redirected toward the target area in a collimated beam. Doppler-shifted radar radiation reflected from a moving target aircraft is reflected back substantially along its original outward path to be received and detected. Simultaneously, sound waves from the target aircraft are received at the primary parabolic reflector and directed to a microphone located at the focus of such primary parabolic reflector, such transmission of the sound waves being made possible by the sound transparency of the hyperbolic sub-reflector. These sound waves are detected by the microphone and converted into a representative electrical signal which is directed to a computer (central processing unit), along with the detected reflected radar radiation information, for analysis, storage, etc.

In a preferred embodiment, the first microphone is protected from transient sound waves by means of selected shielding and by reason of its physical location at the focus of the primary parabolic reflector.

In a preferred embodiment of the present invention, a parabolic primary reflector is used for the propagation and reception of radar radiation and the reception of sound waves. The reflector is operated in the Cassegrainian mode for the propagation of the radar and sound reception occurs, substantially simultaneously, at the focus of the reflector. In operation, radar radiation emanates from a radar feed horn extending through an aperture located in the center of the parabolic reflector. The radar signal is then reflected from a hyperbolic sub-reflector back to the primary parabolic reflector. From the primary reflector, a substantially collimated signal is directed away from the reflector towards a target.

The radar wave then strikes a target and is reflected back towards the apparatus. Signals which are reflected back to the primary reflector are reflected to the hyperbolic sub-reflector and, from there, are reflected back to the radar feed horn. The reflected signal is then analyzed for Doppler shifts due to the velocity of the target in ways well known to those familiar in the art of Doppler radar design.

Importantly, the primary reflector is also used as a sound gathering and focusing device at the same time it is being used to propagate and receive the Doppler-shifted radar radiation. Sound emanating from the target strikes the primary reflector and is directed toward its focus (and, consequently, toward the sub-reflector). However, due to a perforated design, the sub-reflector appears substantially transparent to sound waves while remaining reflective of the radar radiation. Therefore, the sound waves are concentrated at the focus of the primary reflector. A first microphone is placed at the focus to convert the sound into an electronic signal which may be used in a variety of ways.

By way of example, the Doppler radar radiation may be used to determine the strength of reflection by the target, speed of the target, and, by difference, acceleration of the target, and by sums, the distance travelled by the target. The sound information is useful in counting traffic events and the strength of the sound (loudness), its frequency, and its amplitude characteristics are useful in identification of the vehicle and other uses. By combining the above detailed information, a profile of each target may be generated which will allow the determination of whether the detected traffic use was a landing, takeoff, or touch and go, for example. Therefore, not only is a simple count of traffic determined, but the type of usage is determined as well. Also the profile information is useful to determine the type of aircraft (light, medium or heavy) and may be further used to identify the aircraft as being in a subdivision within a given type.

Additionally, in one preferred embodiment, additional microphones are placed offset from, but in relatively close proximity to the axis of the radar and sound primary reflector. These microphones are placed equidistant on either side of and facing in the opposite direction from the first microphone.

The geometry of the placement of this array of microphones is such that they form the points of a triangle having known base leg; the vertex of the triangle is located at the target. Additionally, the array is situated so that the plane defined by microphones is parallel to that of the ground.

In a preferred embodiment, this array operates to accumulate angular data regarding sound sources whose sounds are received by the array. In use, the sound wave front from any given source will reach the two microphones of the array at different times. Each microphone of the array then operates to convert the received sound into an electronic signal. By comparing the time differential of the arrival of the wavefront from a given source at any given pair of microphones the angular position of the sound source with respect to the orientation of that pair of microphones can be determined. By pairing the microphone located at the vertex of the right triangle with each of the other microphones to perform separate angle measurements, the angle of the sound source ranging now over 360° with respect to the right angle can be determined.

This angular information may then be analyzed by the central processing unit, and by comparing angular information from a given source taken over a period of discreet time intervals, the CPU is able to determine if such sound was produced by traffic using a cross-runway. The angular information gained thereby is limited to the plane of the triangle; i.e. the altitude of the target is unknown; however, by placing a fourth microphone directly above the first microphone so that it is the same distance away from the first microphone as the other microphones, the angular altitude of the target may also be determined.

By comparing the time differential of the arrival of the wavefront from a given source at any given pair of microphones the angular position of the sound source with respect to the orientation of that pair of microphones can be determined. By pairing the microphone located at the vertex of the right triangle with each of the other microphones to perform separate angle measurements, the angle of the sound source ranging now over 360° with respect to the right angle can be determined. The angular information gained thereby is limited to the plane of the triangle; i.e. the altitude of the target is unknown; however, by placing a fourth microphone directly above the first microphone so that it is the same distance away from the first microphone as the other microphones, the angular altitude of the target may also be determined.

In a further embodiment a second array which is spaced away from the first array but is otherwise substantially identical to the first array may be used to provide a second set of angular position data. By analyzing information from both arrays, the target's position may be determined through triangulation, either in the horizontal plane or in three dimensions, depending on whether the vertically displaced microphones are used.

It is therefore an object of the present invention to monitor vehicular traffic. It is another object of the present invention to detect, count and/or otherwise gather information relating to aircraft making use of an airport. It is another object of the present invention to simultaneously monitor sound emanating from, and provide selected information regarding such vehicles.

BRIEF DESCRIPTION OF THE DRAWINGS

A more complete understanding of the present invention may be had with reference to the following drawings and detailed description in which.

DETAILED DESCRIPTION OF A PREFERRED EMBODIMENT

Figure 1:
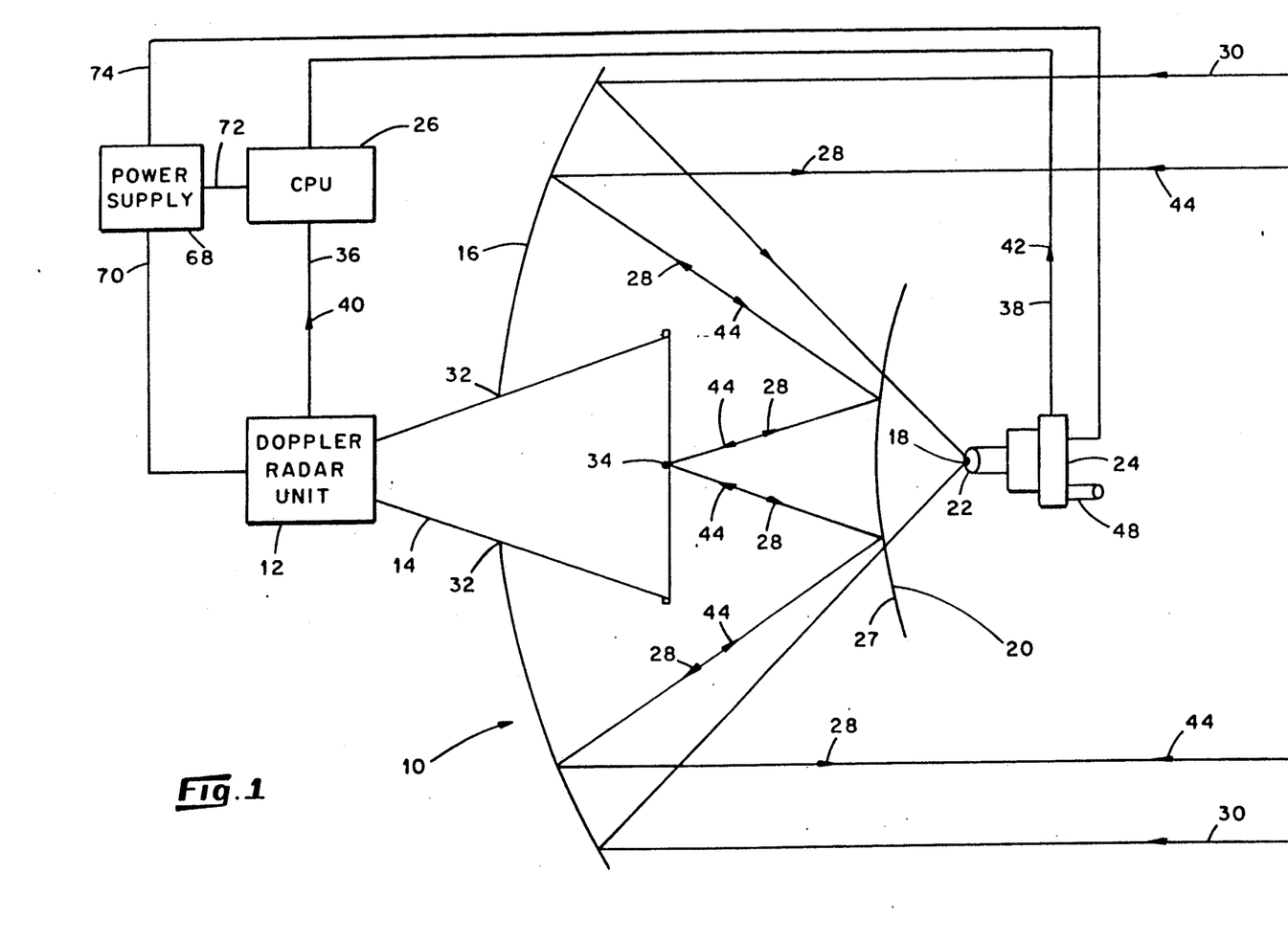
FIG. 1 is a simplified schematic of one embodiment of a monitor for vehicular traffic and embodying various features of the invention.

There is shown in FIG. 1 a simplified schematic of a preferred embodiment traffic monitor 10. The depicted device utilizes two means to gather data on target aircraft, namely, Doppler-shifted radar radiation 44 and sound waves 30 emanating from the target. Radar radiation 28 is generated by a radar unit 12 and is propagated into the atmosphere by a feed horn 14 which projects through a central opening 32 in a primary parabolic reflector. As the radiation 28 departs the feed horn 14 it strikes the reverse surface 27 of a hyperbolic sub-reflector 20 and is reflected back to the primary reflector 16.

The primary reflector 16 is operated in the Cassegrain mode with respect to radar radiation 28. There is provided at its center an aperture 32 through which the feed horn 14 extends. This feed horn 14 is positioned such that the source of the radar radiation is at the Cassegrain focus 34 of the system defined by the primary reflector 16 and sub-reflector 20. The geometry and other descriptive information relating to Cassegrain-type antennas is found in Antenna Engineering Handbook, 2d Ed., (1984), Johnson and Jasik, Editors, which is incorporated herein by reference. Particular attention is invited to pp. 30-6 to 30-21 of this publication.

In this manner, radar radiation 28 departing the monitor 10 leaves as a collimated beam and has an extended range. The microwave radiation 28 strikes a target aircraft (not shown in FIG. 1) and a portion of the microwave radiation 44 is reflected back toward the primary reflector 16. That portion of the radiation 44 so reflected, is reflected from the primary reflector 16 to the sub-reflector 20 and thence towards the Cassegrainian focus 34. In such manner, the radiation 44 reenters the feed horn 14 and returns to the Doppler radar unit 12. The Doppler radar unit 12 analyzes the reflected radiation 44 and determines several parameters such as the strength of the reflection and the velocity of the target. Such information is converted into electronic signals 40 which is transmitted along leads 36 to a central processing unit (CPU) 26 for further analysis or storage.

It should be recognized that the outgoing microwave radiation 28 is generated in bursts of limited duration so that the Doppler radar unit 12 is able to receive and analyze reflected radiation 44 into, e.g., separate velocity and intensity values related to each burst, and thus to provide a time pattern of speed and intensity for the target.

At the same time as the monitor 10 is probing the target with radiation 28, sound 30 emanating from the target is also being received by the primary reflector 16. The sound waves 30 received by the primary reflector 16 are focused toward the primary reflector's focal point 18. Sub-reflector 20, by reason of its construction, is transmissive of sound so that sound 30 received by the primary reflector 16 is not reflected by the sub-reflector 20. Rather, such sound 30 proceeds to the focal point 18. A microphone 22, placed at the focal point 18, converts the sound 30 into an electrical signal which proceeds to a circuit board 24 that includes an amplifier (not shown). The electronics of the circuit board 24 control the microphone 22 and the signal generated thereby.

Proximate to, but separated from the first microphone 22 as by a baffle plate which may also be the circuit board 24, there is provided a second microphone 48. In accordance with the depicted embodiment, this second microphone 48 is positioned to receive sound waves directly from the environment external to but surrounding the monitor 10. In a preferred embodiment, the output from the two microphones 22 and 48 are independently fed to amplifiers (not shown) contained on the circuit board 24. By design, when the sound waves picked up by the first microphone are substantially equal in overall intensity to the sound waves picked up the second microphone, their input signals to the two amplifiers are substantially equal. The output from the two amplifiers is directed to a differential amplifier (not shown) on the circuit board 24. When the two microphone signals are substantially equal, there is no material output from the differential amplifier, hence the output of the system is low. The output signals from this system are transmitted to the CPU 26. With the two microphones receiving substantially the same sound, there is little net signal from the two microphones. On the other hand, when sound from a target aircraft is picked up by the primary reflector 16, concentrated and focused upon the first microphone, the output of such first microphone is substantially greater than the output of the second microphone such that there is generated an output signal from the differential amplifier, thereby resulting in predominance of the output signal from the first microphone and transmission of such amplified signal to the CPU. By means of the aforedescribed combination of two microphones, the present inventor provides for the subtraction of extraneous noise from the sound waves striking the primary reflector 16 and picked up by the first microphone 22, which it will be recognized includes both extraneous sound waves and sound waves emanating from the target aircraft, thereby providing a more truly representative sound wave pattern for analysis.

Analysis of the sound 30 by the CPU yields a variety of data such as the loudness of the sound emanating from the target and the frequency profile of the sound generated by the target.

Based upon the information provided from the Doppler radar unit 12 and the microphone control circuit board 24, the CPU 26 is employed to determine the nature of the operations of the target aircraft. For example, by monitoring changes in the speed of the aircraft and variation in the loudness of the sound emanating from the aircraft, the CPU 26 can determine whether the aircraft was landing, taking off, or shooting a touch-and-go landing, and what direction the aircraft was going. Additionally, the CPU 26 can keep a count of each individual operation at the airport by storing the above described information in memory. With the CPU 26 having a on-board clock, such information can be referenced to a particular time period. Upon retrieval of such information, a detailed profile of the operations of aircraft in an airport can be described without the error inherent in human surveyors or estimates.

A profile will provide information as to how many air operations occurred in a given time period, what type of operation each individual profile represented, and how such operations were distributed in time. Such detailed information would allow for more accurate planning of new airport construction, distribution of government funding based upon usage, in zoning and operations restrictions for noise control; these being but a few of the applications for this type of technology and data. It should be noted that this level of detail, especially such items as relative usage of the runway in its two directions or time distribution of traffic is not recorded even at tower controlled airports; therefore this invention can provide additional useful information on traffic at such airports. Relative usage of a runway in its two directions is important in determining the "noise footprint" over distances of miles from the airport.

Figure 2:
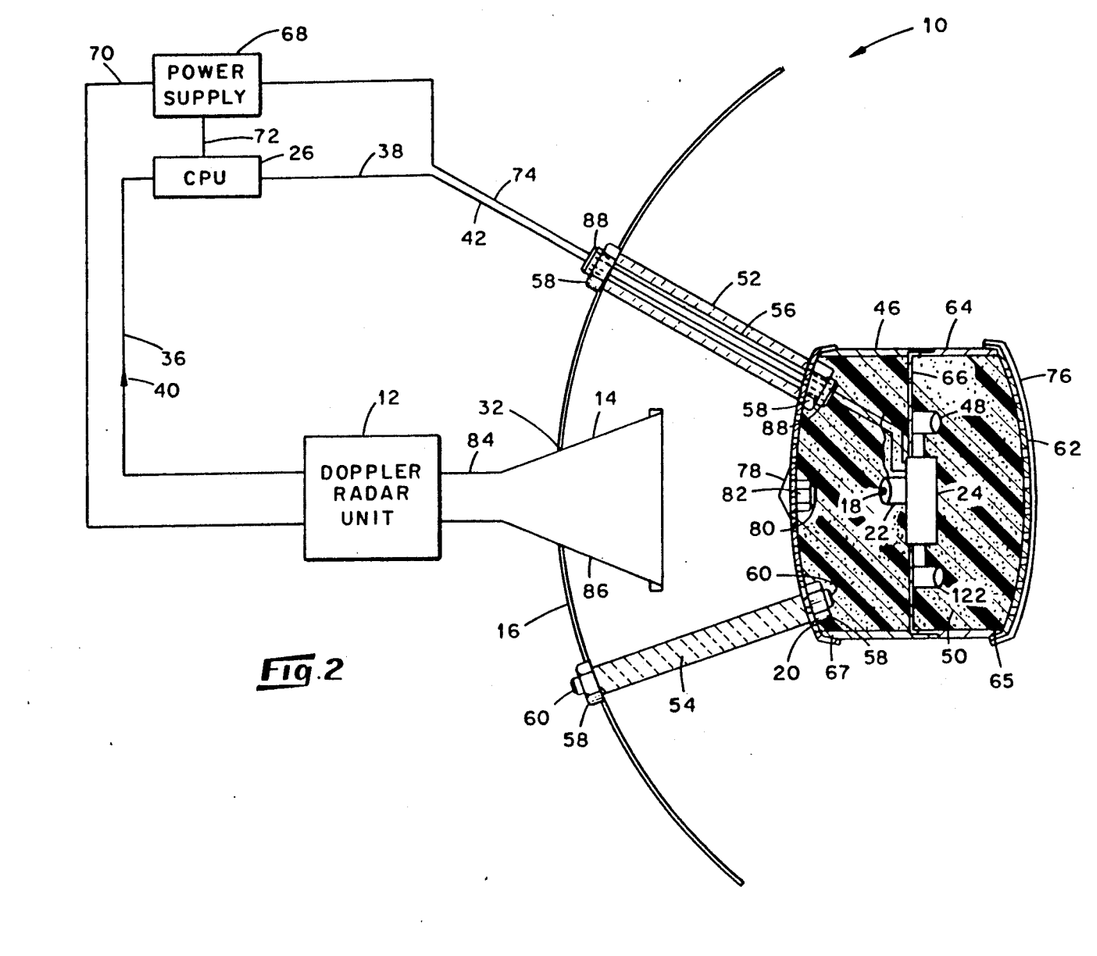
FIG. 2 is a detailed schematic showing additional features of the monitor depicted in FIG. 1.

A more detailed schematic of a preferred embodiment of the present invention is given in FIG. 2. For the sake of clarity, the optical paths shown in FIG. 1 have been deleted but are the same for the embodiment of FIG. 2. The basic elements of FIG. 2 are identical to those described in FIG. 1; the Doppler radar unit 12, the feed horn 14, the primary reflector 16, sub-reflector 20, microphones 22 and 48 and CPU 26 operate as previously described.

In the embodiment depicted in FIG. 2, the horn 14 is constructed of spun aluminum and has a diameter of 2.93" at its open end. The base 84 of the depicted horn 14 is cylindrical with an inner diameter of 0.79" with the cylindrical portion extending for approximately 1.124". The front portion 86 of the depicted horn 14 is conical and extends for 3.024" beyond the back portion 84. The inner diameter of the front portion 86 ranges from 0.79" at the back to 2.93" at the front. This geometry provides for a feed horn angle of approximately 40°. The base 84 of the horn 14 is mounted on an appropriate superstructure (not shown) and its conical portion 86 extends through the aperture 32 of the primary reflector 16 for a distance of approximately 1.56".

The radar unit 12 is attached to the base portion 84 of the feed horn 14 and supplies the outgoing bursts of radar radiation 28, and also analyzes the reflected radiation 44 as described previously. A preferred radar unit 12 is a modified version of the transceiver ("antenna") portion of Model K-15 police traffic radar manufactured by MPH Corporation of Owensboro, Ken., and gives a radar frequency of 10.525 GHz (X-band). Modifications include a smaller horn as described above, and circuits modified to allow shorter bursts of radar to be produced. The preferred timing is a burst lasting 46 ms; counts of the doppler frequency for this time, with 10.525 GHz radar frequency, give speeds of the target directly in feet per second. Thus summation of such counts, if taken at one second intervals, give a close approximation to distance the target has travelled, for example. Acceleration is readily obtained in feet per second per second by simple subtraction of successive speeds, if taken at one second intervals. These relations are advantageous in computer manipulation of this information.

The primary reflector 16 has a focal length of 7.06" and a diameter of 18". It may be metal or constructed from metal coated plastic.

The depicted hyperbolic sub-reflector 20 is made of aluminum 6061 spun on a form that provides the proper geometry. In the depicted embodiment, the reverse surface 27 of the sub-reflector 20 is located 5.43" from the primary reflector 16. The sub-reflector 20 is made transparent to sound waves by drilling a plurality of 13/32" holes through its thickness. The sizing of the holes is such that the surface 27 appears totally reflective to the primary microwave radiation wave length but is transmissive of sound waves and of higher harmonics of the radar frequency. The radius of the sub-reflector 20 is 2.5". The mathematics for calculating proper dimensions and spacing of the horn, primary reflector and sub-reflector are given in the aforelisted Antenna Engineering Handbook.

As depicted, the sub-reflector 20 is the front cover of a sub-reflector assembly 46 which comprises a length of 5" outer diameter aluminum pipe 64 which has tapered ends 65 and 67. The perforated sub-reflector 20 provides one cap for the assembly while another perforated aluminum cap 62 closes the other end of the pipe 64. In this way a spare sub-reflector is available in the field by exchanging end caps. A thin plastic wrapping film is, in one embodiment, applied as a coating over the end caps of the assembly to prevent entry of moisture from the atmosphere into the assembly and consequent damage to the microphone circuitry. Such moisture could also block the fine pores in the foam and cause severe acoustic losses. The interior of assembly 46 is filled with Fine Porosity Scott Industrial foam 50 which serves to reduce wind noise entering the sub-reflector assembly 46. Cutouts in the foam 50 provide mounting for the first microphone 22 located at the focal point 1 of the primary reflector 16 and an associated circuit board 24. An additional cutout allows for the placement of a noise-canceling second microphone 48. A plastic ring 66 with a diameter smaller than the inner diameter of the pipe 64 is used to properly locate the acoustic foam 50 so that the parts mounted inside the foam are properly positioned. This ring, together with the circular circuit board 24, provides an acoustic baffle between microphone 22 and microphone 48. As a further feature, the acoustic foam provides a shock mount for the electronic components mounted therein. In addition, a conductive spray is applied to the foam surface behind the sub-reflector, which absorbs radar higher harmonics.

Due to possible direct reflection of outgoing radar radiation back into the feed horn 14 from the center of the sub-reflector 20, a reflecting cone 78 is placed in the center of the sub-reflector 20. In order that the radar radiation striking the cone 78 not be reflected back into the feedhorn 14, the cone 78 is provided with a geometry such that the cone angular $\Theta$ will deflect radiation beyond the feed horn and to the primary reflector 16. For the geometry of the preferred embodiment this cone angular is 21°. The cone 78 may be constructed of solid metal, preferably aluminum, with an attached bolt 80. The bolt extends through the sub-reflector 20 and is secured by a nut 80.

The noise canceling microphone 48 is mounted facing in an opposite direction than, and preferably is offset from, the microphone 22 at the focal point 18. This noise canceling microphone 48 is used in conjunction with the first microphone 22 to provide a noise canceling feature. As noted, both microphones 22 and 48 have their associated signals picked off and input into amplifiers located on the circuit board 24. When the output of both microphones is constant, as when the same sound level is reaching both microphones, the differential amplifier will reflect the equilibrium and subsequently cause the output of this amplifier contained on circuit board 24 to remain low. On the other hand, when the primary reflector 16 is receiving sound from a target, such sound will be focused at the focal point 18. Under these circumstances, the microphone 22 will have a much greater output than the noise canceling microphone 48. This difference in output between the two microphones will be reflected in the output of the differential amplifier contained on the circuit board 24. The increased output of the amplifier represents primarily the signal from the microphone 22 which is sent to the CPU 26. Thus, the overall operation of the noise canceling microphone 48 prevents sounds that are not being received by the primary reflector from being sent to the CPU 26. This noise canceling feature reduces error due to sources of noise which are not targeted aircraft.

A further feature of the disclosed device is a cross-runway use detector the design and operation of which will be described with reference to FIGS. 5-8. To avoid inaccurate counting at airports with cross-runways, the cross-runway use detector feature is helpful. Normally, traffic other than that on the subject runway will be discounted due to the noise canceling microphone feature of the disclosed device (shown in FIG. 2); i.e., sound which is not produced by an aircraft on the target runway will be substantially the same at both the microphone 22 at the focus of the parabolic mirror and at the offset microphone 48. Under such circumstances, the microphone circuitry 24 will ignore such sounds. However, if there is a runway 136 which crosses the target runway 134 as depicted in FIG. 7, aircraft 188 utilizing the cross-runway will be within the device's field of view 142 as that aircraft crosses the intersection 140 of the cross-runway 136 and the target runway 134. For a short period of time, such an aircraft 138 will appear to the device to be on the target runway 134, and the sound at the focus of the mirror 18 will be significantly greater than at the offset microphone 48; a situation which could result in the aircraft 138 being counted as traffic on the target runway 134.

This cross-runway use could be detected by the CPU 26 (of FIG. 2) if angular information about the target aircraft is available. The cross-runway feature provides this information with the addition of a third, offset microphone 122 in the sub-reflector assembly and appropriate controlling circuitry contained on a circuit board 120. "The sum of the signals from microphones 48 and 122, divided by 2, are used to retain the noise cancelling feature by utilizing this signal in place of the signal from microphone 48 alone (cf p. 12 line 1 ff). The individual outputs of microphones 48 and 122 are used to provide timing information and allow angular position of the target, relative to the axis of the radar and sound systems. This angular information is confined in this embodiment to the plane parallel to the ground and to angles a little less than $-+90°$ with respect to the axis because of the location of the microphones within housing 64 of FIG. 2. Equal length tubes for guiding the sound waves from the perforated front surface 72 of FIG. 2 to the microphones 48 and 122 can substantially increase the "field of view" and thus the angular range of the cross-runway feature to nearly + or $-90°$.

Figure 8:
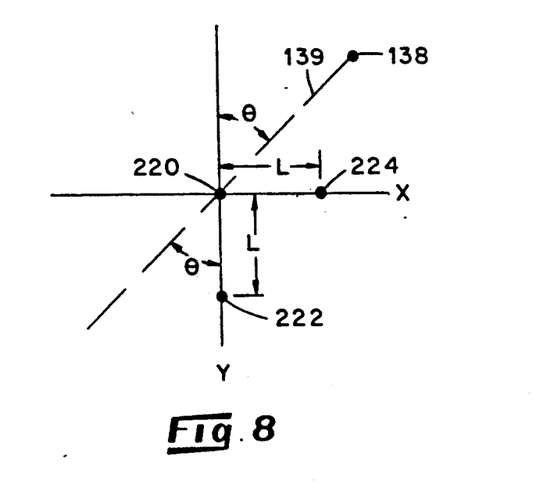
FIG. 8 is a representation showing the geometric relationship between microphone array and a sound source.

In another embodiment the three microphones could be arranged as in FIG. 8, but outside the confines of housing 64 and end cap 72. One of these could continue to serve the noise cancelling function of microphone 48 in FIG. 2.

Figure 6:
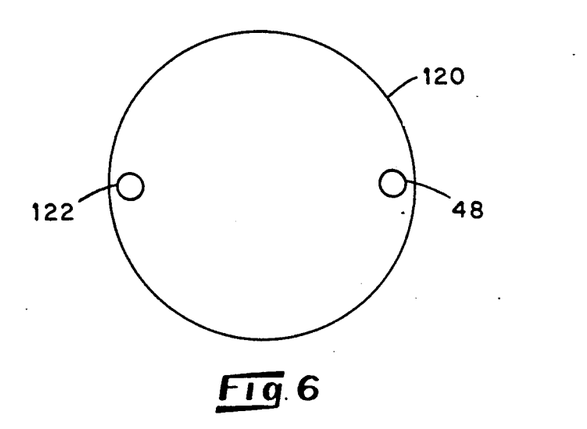
FIG. 6 is a representation of the circuit board showing the position of microphones thereon.
Figure 7:
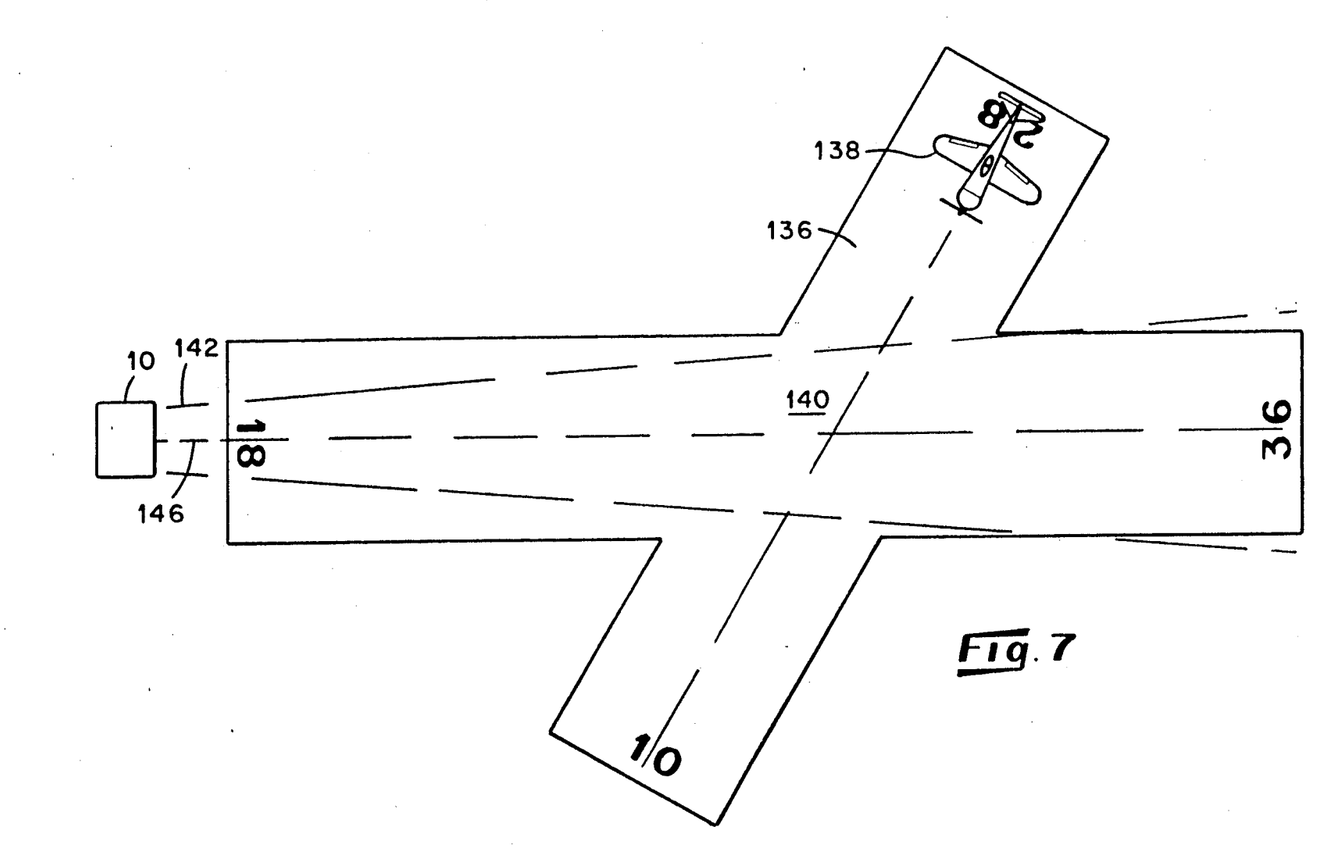
FIG. 7 is a perspective view showing the monitor, a target runway, and a cross-runway.

FIG. 6 is a simplified schematic of the circular circuit board 120 and the position of microphones 48 and 122 thereon. Microphone 22 is located on the back of circuit board 120 and in the center. This board would be positioned in the sub-reflector assembly 46 by a retaining ring as previously described with reference to FIG. 2.

With reference now to FIG. 8 the three microphones 220, 224, and 222 form the points of a right triangle with the microphone 220 situated on the origin of coordinator. The two offset microphones 224 and 222 are equidistant from the axis and the entire microphone array 144 is positioned so as to be in plane parallel to the plane of the ground.

With reference now to FIG. 8, sound waves generated by a target vehicle 138 will generally reach one microphone of the array 144 a measurable time before reaching another microphone of the array 144. Therefore, by measuring the time differential between a sound wave striking successive microphones in the array 144 and by the right angle geometry of the array 144, the angular position $\theta$ of the target can be determined relative to the geometry of the array 144. Generally, the microphone 220 is the origin of the geometry of the array 144, since it is on the axis 146 of the device 10 and the desired angular measurements are made relative to this axis 146 as shown in FIG. 7.

By performing a sampling of the microphones 220, 224 and 222 of the array 144 at discrete time intervals, the angular position of a target aircraft 138 can be tracked and that information can be stored in the CPU 26 along with other data generated by the device 10. It is then relatively easy to add data taken from aircraft utilizing a cross-runway 136 the position of which relative to the target runway 134 is known.

A further feature of the cross-runway detector of the disclosed device 10 is the provision of circuitry on the microphone circuit board 120 for providing the various microphone features. By provision of two timing outputs from microphones 88 and 122 the circuit board 120, an independent time reference framework is provided for controlling the various microphone features.

For example, the circuitry is designed so that at discrete time intervals, every 6 sec. by way of example, the microphone timing circuits are activated so that the angular information may be generated and utilized. In the intervening time periods and at discrete intervals, the summed originals from microphones 48 and 122 are used so that the noise cancelling features of the device as previously described may be utilized. At other times, when neither feature is operating, the system powers down so as to conserve battery power.

Referring again to FIG. 8, the general angular relationship of a sound source 138 to an array 144 of microphones 220, 224, and 222 in the described geometry is described by the following equations for the given microphone pairs:

$$\text{Microphones 220 and 224} - \Delta T = L/c \sin \theta \qquad (1)$$

$$\text{Microphones 220 and 222} - \Delta T = L/c \cos \theta \qquad (2)$$

where $\Delta T$ is the time differential when a given sound wavefront reaches the respective microphones; L is the distance between the microphones; and c is the speed of sound.

Each microphone 220, 224, and 222 will be receiving the sound generated by an aircraft and producing a signal corresponding to that sound. The electronic signal will be substantially a sine wave and may be referenced to a time axis established by an on-board clock. The time differential, $\Delta T$ can be determined by taking the electronic signal generated by each microphone of a selected pair of microphones and converting it to a digital square wave with each "step" of the square wave corresponding to a crossing of the time axis of the sine wave signal from the microphone in ways well known in the electronic signal processing art. Thus, each signal may then be sent to a slope detector which will generate a signal at each occurrence of a particular slope (either up or down slopes may be used as long as the same slope is detected on each signal). The outputs of the slope detectors may be compared utilizing a standard time reference provided by the on board clock and the time differential between the outputs of the slope detector signals can be determined. It will be apparent to one skilled in the art that the time differential between the outputs of the slope detectors substantially corresponds to the time differential in a given wavefront reaching the two microphones. This signal processing can be performed by circuitry on the circuit board 120 or the sine wave signals can be amplified at the circuit board 120 and sent to the CPU 209 for processing and storage.

Figure 9:
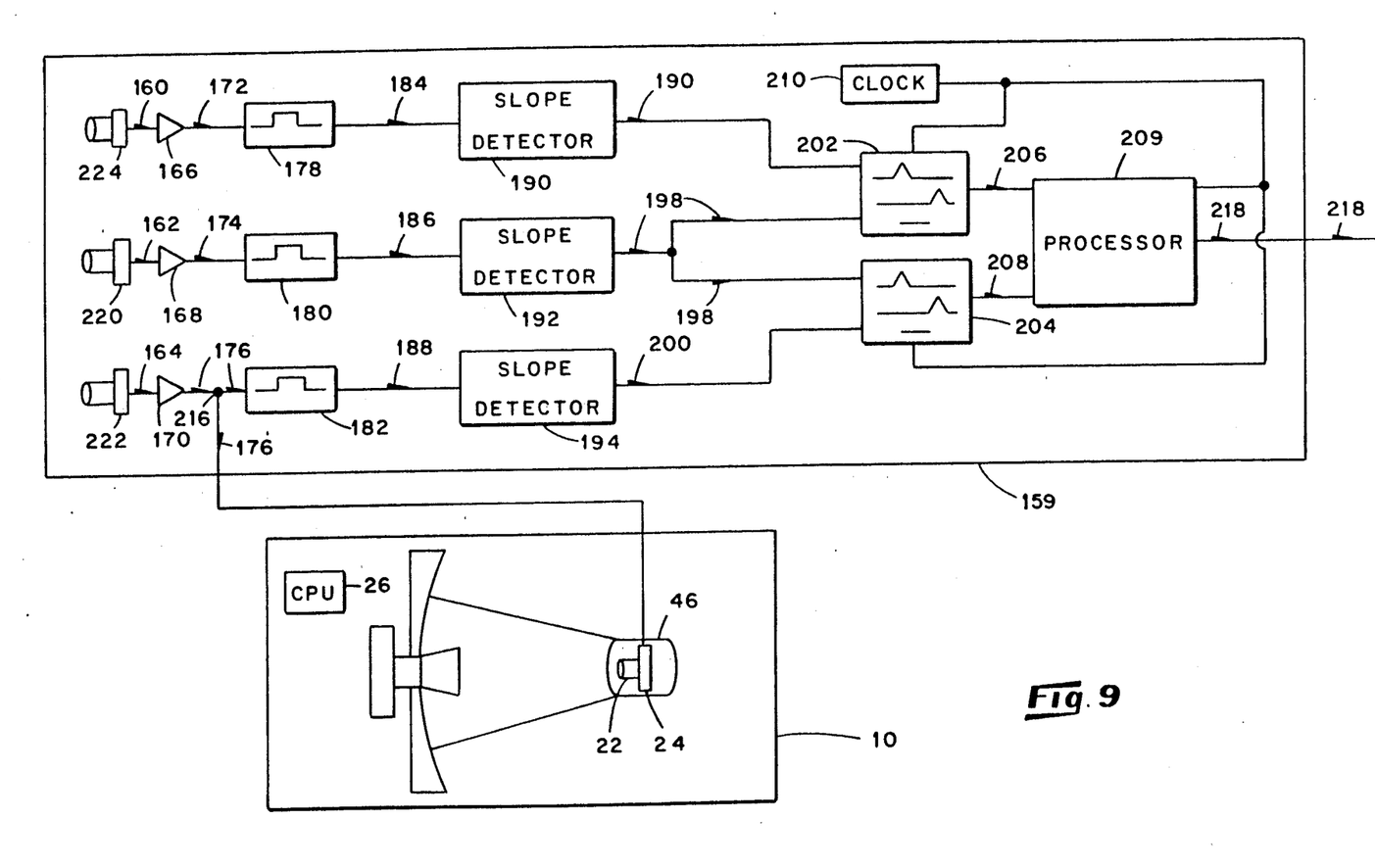
FIG. 9 is a schematic circuit diagram showing a three microphone array.

With reference now to FIG. 9, a simplified schematic of a microphone array and circuitry 159 will be described. Microphones 224, 220 and 222 receive sound emanating from a possible target. Each microphone converts the sound into an electronic signal as indicated at 160, 162 and 164. Each of these signals is amplified as by operational amplifiers indicated at 166, 168 and 170. The result is an amplified microphone signal from each microphone as indicated by 172, 174 and 176.

Each of the amplified signals may then be directed to a square wave generator as indicated at 178, 180 and 182; it should be noted that the square wave generators may be separate units or could all be contained on one integrated circuit chip. These square wave generators would take the amplified microphone signals 172, 174 and 176 and generate square wave signals 184, 186 and 188 corresponding to the amplified microphone signals.

The square wave signals 184, 186 and 188 would then be directed to slope detectors 190, 192 and 194 which would generate a pulsed output from the occurrence of a predetermined slope. For example, the slope detectors may be configured so as to generate an output signal upon the occurrence of an up-slope on the square wave or a down-slope on the square wave; the selection of slope is not material as long as the same slope is used to generate the pulse for each slope detector.

The outputs of the slope detectors will be pulsed signals 196, 198 and 200. Pulsed signal 198 is then directed to two chips 202 and 204 for comparison to each of the pulsed signals 196 and 200.

One skilled in the art would recognize at this point that each of the pulsed signals 196, 198 and 200 essentially correspond to the variations in the sound received at each of the microphones 224, 220 and 222. Each of the three microphones would be receiving substantially the same sound and the only difference in the pulsed signals 196, 198 and 200 would be the time differential based upon the time the sound reached each microphone.

An onboard clock 210 is used to provide a time frame of reference so as to give a background reference for determination of the time differential. Pulsed signals 196 and 198 are directed to chip 202 and the occurrence of the pulses are compared with reference to the time signal generated by the clock 210. Likewise, pulsed signals 198 and 200 are directed to chip 204 where they are compared with reference to the same time frame of reference generated by clock 210. A signal corresponding to the time differential between the two signals is generated on each chip 202 and 204 and the signals 206 and 208 corresponding to the time differential are then directed to the central processing unit 209; this CPU 209 could be a microprocessor contained on the microphone circuit chip or the CPU 26 of the detector 10. The output of the processor 209 would be a signal 218 corresponding to the angular vector 139 of the target 138.

It should be understood that essentially the same analysis could be conducted in a multitude of various electronic setups. For example, the time differential signals 206 and 208 could be analyzed by a chip located on the microphone circuit board 120 of FIG. 6 and a signal 218 corresponding to the angular orientation of the target could be sent to the CPU 26.

Additionally, the noise canceling microphone feature can be added to the above-described setup. Pick off point 216 could be utilized to pick off the amplified signal 176 from one of the microphones 222 of the array and direct it to the circuit board 24 in housing 46 of the device 10. The picked off signal 176 and the signal from microphone 22 at the focus could then be directed to an operational amplifier configured as a differential amplifier. At discrete time intervals, as determined by the onboard clock, the differential amplifier would function as a noise canceling feature as was previously described. It is not necessary that the signal 176 be directed to the circuit board 24, it could alternatively be directed to the CPU 26 and the noise cancellation could be performed there.

The remaining variables are established by the geometry of the microphone array; i.e., L is known and c is a constant at given temperature and barometric pressure. Therefore, either by circuitry or a programmed microprocessor, the value of θ may be determined once the time differential is measured. While the preceding discussion has referred to the process with respect to one pair of microphones; it should be noted that this procedure occurs substantially simultaneously for microphone pair 22 and 46, and microphone pair 22 and 122. By comparison of the results of each pair the appropriate angle may be established.

Additionally, such angular data may be used for more than adding cross-runway use detections from the traffic count for a given runway. For example, the angular information could be used to track traffic utilizing the target runway. Such traffic would initially proceed down the axis 146 of the device 10 and the angular measurement would reflect this information, but by tracking the target further, the direction of departure can be determined using angular information. This information may be further utilized to classify the type of use of a given target aircraft because the angular behavior of an arriving aircraft, a departing aircraft or an aircraft which is remaining in the traffic pattern and shooting touch and go landings will be distinguishable upon analysis of an angular track of the target by the CPU 26.

Referring now to FIG. 2, the sub-reflector assembly 46 of the depicted embodiment is held in position by a tripod arrangement of tubes 52 and 54 and a further tube which is identical to tube 54 but is not shown because of the perspective of the drawing. Each tube 54 and 52 is made of G10 fiberglass which is substantially transparent to microwave radiation. The rods are spaced radially equidistant, preferably about 3¼", from the center of the primary reflector 16 and about 2" from the center of the sub-reflector 20 which allows the ends of the tubes 52, 54 and the one not shown, to be approximately perpendicular to both the surface of the primary reflector 16 and the surface of the sub-reflector 20 for mounting purposes. All of the tubes are 5.477" in length.

For the tube not shown and tube 54, a nylon screw 60 is tapped into each end of the rod which provides for securing the primary reflector 16 and the sub-reflector 20 to these rods. Each screw is placed through a hole at the appropriate location on each reflector unit and then a nut 58 may be screwed onto the screw to secure the attachment. Tube 52 also serves as a conduit for receiving therethrough electrical leads 42 and 74. A smaller metal tube 88, exteriorly threaded at each end, passes through the tube 52 in order that the leads 42 and 74 ma be shielded from the radar field while passing through tube 52. Nuts 58 are used to secure the attachment. In addition, all of the tubes could be constructed in a manner of tube 52 to provide additional wiring conduct if necessary for the cross-runway use detector or simply for added stiffness of the tubes.

A power supply 68, such as a 12-volt battery, provides power for the analyzer 10. An electrical lead 70 provides power to the Doppler radar unit 12, a lead 72 provides power to the CPU 26, and a lead 74 provides power to the microphone circuit board 24 in the sub-reflector assembly 46.

Figure 3:
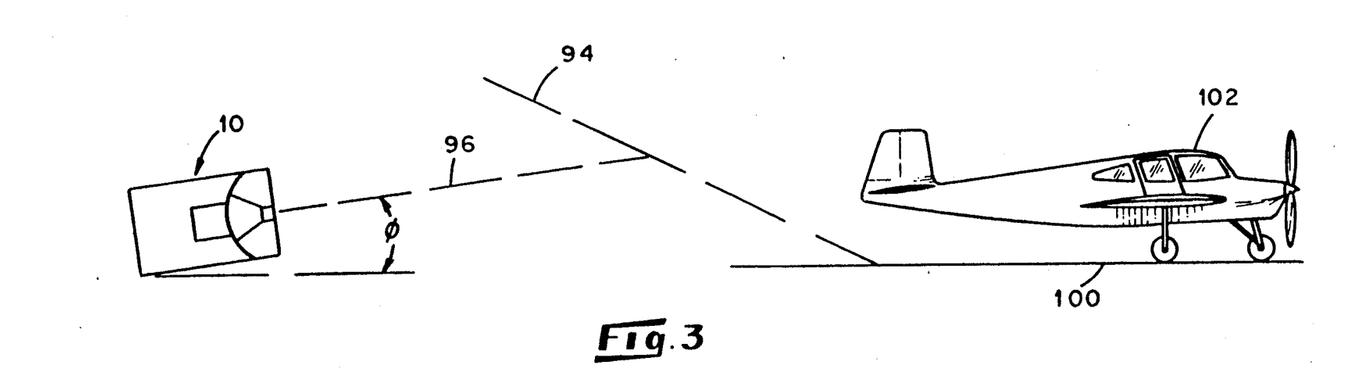
FIG. 3 is a perspective view showing a monitor in accordance with the present invention as used at an airport for monitoring aircraft traffic.

Referring now to FIG. 3, an example of placement and operation of the monitor for use in monitoring aircraft traffic is shown. The depicted aircraft monitor is placed off one end of a runway 100, usually between about 300 and 800 feet beyond the end of the runway, and a distance of 5 feet or more above the runway elevation. A major requirement for placement of the monitor is that it be below the specified glide slope 94 for that particular runway. The monitor is aimed so that its extended central axis 96 defines an angle of between about 1° and 2° with the ground level of the runway thereby reducing the occurrence of ground reflections. In operation the monitor takes data of a target aircraft 102 using the runway 100. The data may be dealt with in a variety of ways, for example, the data acquired and analyzed by the CPU 26 of FIG. 1 can be stored and later downloaded into a controller and temporary storage unit and then transferred to a personal computer for report generation. In this manner, the monitor does not have to be taken out of service to allow the retrieval of the data.

Figure 4:
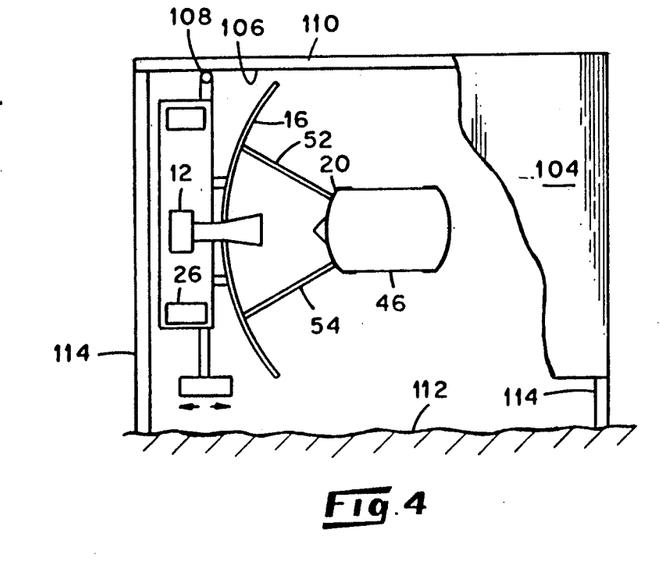
FIG. 4 is a representation of one embodiment of superstructure for mounting a monitor in position for use.
Figure 5:
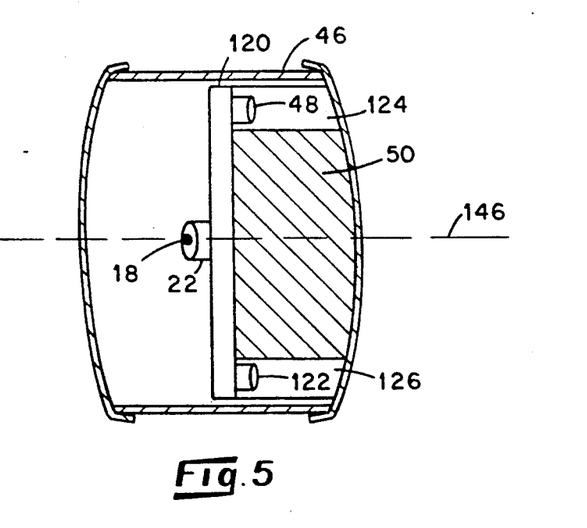
FIG. 5 is a simplified schematic of the sub-reflector assembly of FIG. 2 showing the elements of the cross-runway use detector.

With reference to FIG. 4, there is depicted one embodiment of certain superstructure for mounting the several components of the present monitor. Specifically, the depicted superstructure comprises a platform 80 supported generally horizontally in spaced relationship the ground 82 or other supporting surface as by a plurality of legs 84 which preferably are electrically isolating. As shown, several of the components of the monitor are contained within a housing 86 which is in turn suspended as by a swivel connection 108 or the like to the underside 106 of the platform 80. In this manner, the components of the monitor are protected from the direct rays of sunlight, and or other weather elements. In one embodiment, there is provided a skirt 104, of a material such as canvas or the like, which surrounds the perimeter of the platform and drapes therefrom to a location spaced above the ground 82 to provide further protection from the elements. As necessary, portion(s) of the skirt are cutaway to permit the uninhibited passage of radar radiation and/or sound waves to and from the monitor, or a radar and sound transparent window is provided therein.

Figure 11:
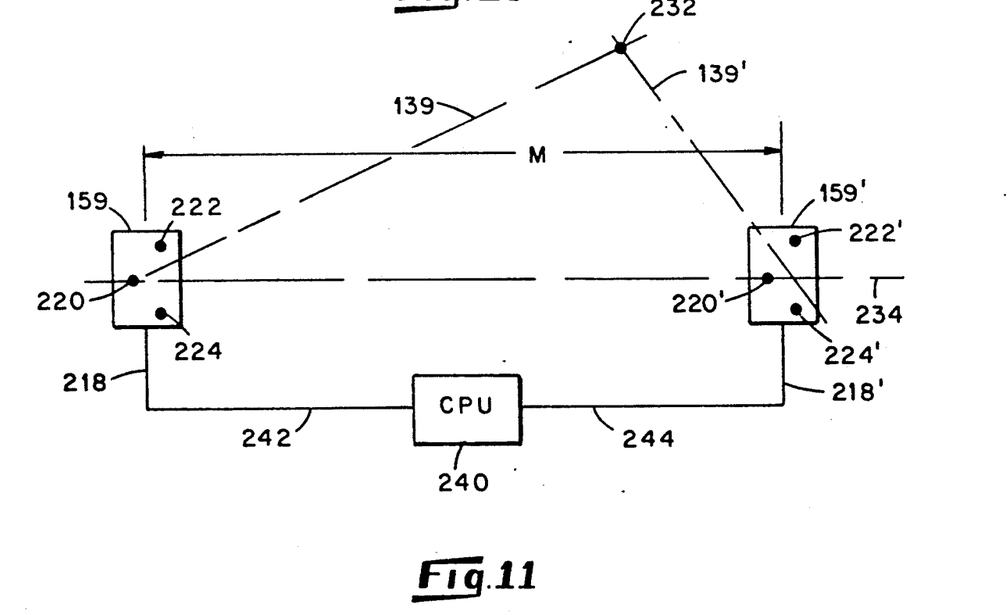
FIG. 11 is a schematic diagram showing two arrays used as a position tracker.

The microphone array and assorted circuitry 159 may also be used as a traffic tracker as shown in FIG. 11. In this embodiment, two identical microphone arrays 159 and 159' are separated by a distance m, preferably on the order of about 1000 feet. The arrays 159 and 159' are aligned so that the central microphones 220 and 220' are on a common axis 234 and the orientation of microphones 224 and 224' and 222 and 222' are substantially the same. A target 232 generating sound may then be tracked.

As was previously described with reference to FIGS. 8 and 9 the arrays 159 and 159' are capable of determining the angular vectors 139 and 139' of the target with respect to arrays 159 and 159'. However, due to the linear separation of the arrays 159 and 159', the angular relationship of vectors 139 and 139' to microphones 220 and 220' will therefore be different. Signals 218 and 218' are then sent to a central processing unit 240, as by lines 242 and 244; or, alternatively by radio or light beam transmitters and receivers. The CPU 240 may then determine the position of the target by the well-known method of triangulation. The triangulation could be performed either by hardware on the CPU 240 or by software. The position determination could be carried out at predetermined intervals and stored to provide a complete track of a target vehicle's operations.

Figure 10:
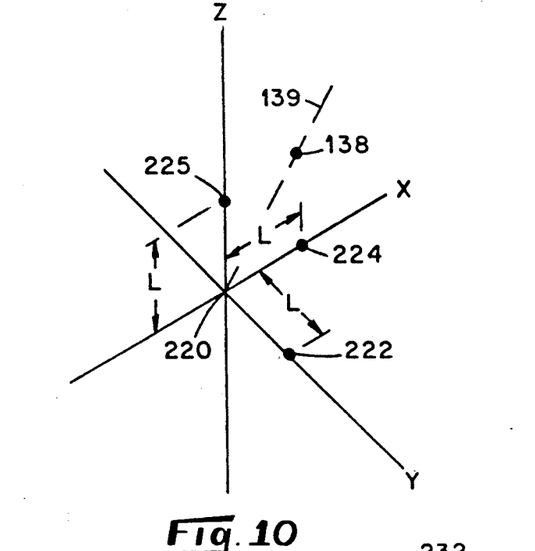
FIG. 10 is a representation showing the geometric relationship between microphones in a four microphone array.

FIG. 10 shows a modified microphone array that can replace the three microphone array. In this embodiment a fourth microphone 225 is positioned above the plane defined by microphones 220, 222, and 229 as is indicated, microphone 225 is at a 90° angle with respect to microphones 222 and 224 and located distance L from microphone 220. The same type of time differential calculation is conducted with respect to microphones 220 and 225 as was previously described with the other microphone pairs.

With the three microphone array as pictured in FIG. 8, the positioned information was limited to the plane of the microphones. However, the addition of the fourth microphone 225 on the z-axis of FIG. 10, provides angular altitude information as well. Thus the four microphone array may be substituted for the three microphone array in any of the previously described embodiments to provide more detailed information. As an example helicopter traffic, not usually on runways, could be monitored.

It is anticipated that the monitor 10 or tracker are capable of many modifications and substitutions which would not depart from the scope of the claims which follow. For example, they could be used to count, profile, or track highway traffic as opposed to air traffic. Therefore, the previous description of a preferred embodiment was by way of illustration and not of limitation.

What is claimed is:

1. An apparatus for counting and analyzing air traffic comprising at least one individual type of aircraft generating sound and conducting one of a plurality of possible flight operations at an airport consisting of a target runway and at least one cross-runway intersecting the target runway comprising:

radar means for generating and propagating radar radiation of a predetermined wavelength to be directed towards a target and for converting any doppler-shifted radar radiation reflected by said target into first electronic signals corresponding to said reflected doppler radiation;

reflector means having a focus for directing said radar radiation generated by said radar means toward target air traffic conducting flight operations and for receiving reflected doppler radar radiation reflected by said target air traffic and simultaneously for receiving sound generated by said air traffic conducting flight operations said reflector means further comprised of, a parabolic primary reflector having an aperture located at its center through which radar radiation may pass, operated at its focus as to sound, operated in a Cassegrainian mode as to radar radiation, for directing radar radiation towards a target aircraft and for simultaneously receiving reflected doppler radiation and sound; and a hyperbolic sub-reflector having a front surface and a rear surface located between said primary reflector and the focus of said primary reflector, for directing radar radiation emanating from said aperture in said primary reflector toward said primary reflector and for directing received reflected doppler radiation from said primary reflector toward said aperture in said primary reflector, said hyperbolic sub-reflector being constructed so as to be transmissive of sound; and microphone means for converting said received sound into a second electronic signal corresponding to said received sound said microphone means further comprising a cross-runway use detector; and analyzer means for analyzing said first and second electronic signals to determine a plurality of parameters of said air traffic conducting flight operations at said airport.

2. The apparatus of claim 1 wherein the hyperbolic sub-reflector has a plurality of holes drilled through the thickness thereof, said holes having a diameter smaller than the diameter of a circular wave guide which would transmit the wavelength of said doppler radar radiation.

3. The apparatus of claim 2 wherein the doppler radiation propagation means partially extends through the aperture of the primary reflector.

4. The apparatus of claim 1 wherein said microphone means comprises:

a first microphone, located at the focus of said parabolic reflector and facing said reflector for generating a first microphone signal corresponding to received sound;

a second microphone, offset from said first microphone and located a predetermined distance from said first microphone for generating a second microphone signal corresponding to received sound;

a third microphone offset from said first microphone and generally opposite said second microphone located a distance from said first microphone equal to the distance between said first and second microphones for generating third microphone signal corresponding to received sound, the geometric relationship of said first, second and third microphones substantially defining a triangle with the plane of the triangle being generally parallel to the ground; and circuitry means for comparing said first, second and third microphone signals and determining a plurality of parameters of the received sound.

5. The apparatus of claim 1 wherein said microphone means further comprises:

a focus microphone located at the focus of said primary reflector for generating a target signal corresponding to received sound;

array means displaced from said focus microphone for determining the angular position of an aircraft and providing a noise-canceling microphone feature wherein said array is comprised of:

a first microphone for generating a first microphone signal corresponding to received sound, a second microphone, offset from said first microphone and located a predetermined distance from said first microphone for generating a second microphone signal corresponding to received sound, a third microphone offset from said first microphone and generally opposite of said second microphone located a distance from said first microphone equal to the distance between said first and second microphones for generating a third microphone signal corresponding to received sound, the geometric relationship of said first, second and third microphones substantially defining a right triangle with said first microphone located at the vertex of the right angle and the plane of the triangle being generally parallel to the ground, and circuitry means for comparing said first microphone signal to each of said second and third microphone signals and generating a first vector signal corresponding to the angular position of the target vehicle with respect to said first microphone array, said array having a predetermined spatial orientation and providing said first vector signal as output; and a noise canceling microphone feature comprising pick off means for directing said first microphone signal and said target signal to a differential amplifier having as input said target and first microphone signals and generating an output said differential amplifier configured such that when said target signal and said first microphone signal the same, the output is zero and when said target signal is greater than said first microphone signal, the output substantially corresponds to said target signal.

6. The apparatus of claim 5 wherein said array means further comprises:
   a fourth microphone for generating a fourth microphone signal corresponding to received sound, located above the plane defined by said first, second and third microphones and such that said fourth, first and second and said fourth, first and third microphones each define a right triangle having said first microphone located at the right angle thereof; and
   said circuitry means adapted to further compare said first and fourth microphone signals in determining said plurality of parameters.

7. The apparatus of claim 4 wherein the cross-runway use detector of said microphone means and said circuitry means further comprises:
   timing means for providing a time frame of reference for signal analysis;
   a square wave generator means for generating a square wave signal corresponding to each of said second and third microphone signals having as input each of said second and third microphone signals and having as output second and third square wave signals:
   slope detector means for generating a pulsed signal corresponding to predetermined slope changes in each of said square wave signals having as input said second and third square wave signals and having as output first, second and third pulsed signals;
   time differential detector means for comparing said second pulsed signal to said third pulsed signal with respect to said time frame of reference and generating a time differential signal corresponding to the time interval between said and second pulsed signal said third pulsed signal and having as input said second and third pulsed signals and having as output said time differential signal; and
   angular measurement means having as input said time differential signal for determining the angular location of said target vehicle with respect to said second and third microphones based upon said time differential signal and the geometry of said microphone means and generating a vector signal corresponding to the angular position of the target.

8. The apparatus of claim 4 wherein the circuitry means further comprises noise canceling microphone means comprising:
   first pick off means for intercepting said first microphone signal at predetermined time intervals and providing said first microphone signal as output when said first microphone signal is intercepted;
   second pick off means for intercepting said second microphone signal at predetermined intervals, substantially corresponding to the predetermined intervals as utilized by said first pick off means, and providing said second microphone signal as output when said second microphone signal is intercepted; and
   differential amplifier means having as input the outputs of said first and second pick off means and generating an output, wherein, when said first and second microphone signals are substantially equal, little or no output is generated by said differential amplifier means and when said first microphone signal greater than said second microphone signal, as when an aircraft is utilizing the target runway, the output of said differential amplifier means substantially corresponds to said first microphone signal.

9. The apparatus of claim 1 wherein one of the plurality of parameters determined is the total number of individual aircraft comprising the air traffic during a predetermined time period.

10. The apparatus of claim 1 wherein one of the plurality of parameters determined is the type of flight operation being conducted by each individual aircraft comprising the air traffic during a predetermined time period.

11. The apparatus of claim 1 wherein one of the plurality of parameters determined is the direction of each individual aircraft comprising the air traffic during a predetermined time period.

12. The apparatus of claim 1 wherein one of the plurality of parameters determined is the type of each individual aircraft comprising the air traffic at during a predetermined time period.

13. An apparatus for counting and analyzing air traffic comprised of at least one individual type of aircraft generating sound and conducting one of a plurality of possible flight operations at an airport consisting of a target runway and at least one cross-runway intersecting the target runway comprising:
   radar means for generating and propagating under radiation of a predetermined wavelength to be directed towards a target in converting any doppler shifted radar radiation reflected by said target into a first electronic signal corresponding to said reflecting doppler radiation;
   reflector means having a focus for directing said radar radiation generated by said radar means toward target air traffic conducting flight operations and for receiving reflector doppler radar radiation reflected by said target air traffic and simultaneously for receiving sound generated by said air traffic conducting flight operations, said reflector means further comprising,
      a parabolic primary reflector having an aperture located at its center through which radar radiation may pass, operated at its focus as to sound, operated in a cassegranian mode as to radar radiation, for directing radar radiation towards a target aircraft and for simultaneously receiving reflected doppler radiation and sound; and
      a hyperbolic sub-reflector having a front surface and a rear surface located between said primary reflector in the focus of said primary reflector, for directing radar radiation emanating from said aperture in said primary reflector toward said primary reflector and for directing received reflected doppler radiation from said primary reflector towards said aperture in said primary reflector, said hyperbolic sub-reflector being constructed so as to be transmissive of sound;
   microphone means for converting sound received from target aircraft into a second electronic signal and comprising a cross-runway use detector for detecting air traffic utilizing a cross-runway and separating said cross-runway traffic from target runway traffic said microphone means further comprising,
- a first microphone, located at the focus of said parabolic reflector and facing said reflector for generating a first microphone signal corresponding to received sound,
- a second microphone, offset from said first microphone and located a predetermined distance from said first microphone for generating a second microphone signal corresponding to received sound,
- a third microphone, offset from said first microphone and generally opposite said second microphone located at a predetermined distance from said second microphone for generating a third microphone signal corresponding to received sound,
- the geometric relationship of said second and third microphones substantially defining a line generally parallel to the ground, and
- circuitry means for comparing said first, second and third microphone signals and determining a plurality of parameters of the received sound; and
- analyzer means for analyzing said first and second electronic signals to determine a plurality of parameters of said air traffic conducting flight operations at said airport, said second electronic signal substantially corresponding to said first microphone signal.

14. The apparatus of claim 13 wherein the hyperbolic sub-reflector has a plurality of holes drilled through the thickness thereof, said holes having a diameter smaller than the diameter of a circular wave guide which would transmit the wavelength of said doppler radar radiation.

15. The apparatus of claim 14 wherein the doppler radiation propagation means partially extends through the aperture of the primary reflector.

16. The apparatus of claim 13 wherein the cross-runway use detector of said microphone means and said circuitry means further comprises:
- timing means for providing a time frame of reference for signal analysis;
- a square wave generator means for generating a square wave signal corresponding to each of said second and third microphone signals, having as input each of said second and third microphone signals and having as output second and third square wave signals;
- slope detector means for generating a pulsed signal corresponding to predetermined slope changes in each of said second and third square wave signals having as input said second and third square wave signals and having as output second and third pulsed signals;
- time differential detector means for comparing said second pulsed signal generated from said second microphone signal to said third pulsed signal with respect to said time frame of reference and generating a time differential signal corresponding to the time interval between said second pulsed signal and said third pulsed signal and having as input said second and third pulsed signals and having as output said time differential signal; and
- angular measurement means for receiving said time differential signal, determining the angular location of said sound source with respect to said second and third microphones based upon said time differential signal and the geometry of said microphone means and generating a signal corresponding to said angular location, wherein said signal is analyzed to determine if said sound source is using the target runway or a cross-runway.

17. The apparatus of claim 13 wherein the circuitry means further comprises noise cancelling microphone means comprising:
- first pick off means for intercepting said first microphone signal at predetermined time intervals and providing said first microphone signal as output when said first microphone signal is intercepted;
- second pick off means for intercepting said second microphone signal at predetermined intervals, substantially corresponding to the predetermined intervals as utilized by said first pick off means, and providing said second microphone signal as output when said second microphone signal is intercepted; and
- differential amplifier means having as input the outputs of said first and second pick off means and generating an output, wherein, when said first and second microphone signals are substantially equal, little or no output is generated by said differential amplifier means and when said first microphone signal greater than said second microphone signal, as when an aircraft is utilizing the target runway, the output of said differential amplifier means substantially corresponds to said first microphone signal.

18. The apparatus of claim 13 wherein one of the plurality of parameters determined is the total number of individual aircraft comprising the air traffic during a predetermined time period.

19. The apparatus of claim 13 wherein one of a plurality of parameters determined is the type of flight operation being conducted by each individual aircraft comprising the air traffic during a predetermined time period.

20. The apparatus of claim 13 wherein one of the plurality of parameters determined is the direction of each individual aircraft comprising the air traffic during a predetermined time period.

21. The apparatus of claim 13 wherein one of the plurality of parameters determined is the type of each individual aircraft comprising the air traffic at during a predetermined time period.

22. A traffic analyzer for determining a plurality of parameters of traffic which is operating generally near the analyzer and substantially constantly emitting sound, the parameters to be determined including the spatial position of a target vehicle at discrete time intervals and the nature of the target vehicle's operations by analyzing the change in the spatial position of the target vehicle over time comprising:
- a first microphone array comprised of a first microphone for generating a first microphone signal corresponding to received sound, a second microphone, offset from said first microphone and located a predetermined distance from said first microphone for generating a second microphone signal corresponding to received sound, a third microphone offset from said first microphone and generally opposite of said second microphone located a known distance from said first microphone for generating a third microphone signal corresponding to received sound, the geometric relationship of said first, second, and third microphones substantially defining a right triangle with said first microphone located at the vertex of the right angle and the plane of the triangle being generally parallel to the ground, and first circuitry means for comparing said first microphone signal to each of said second and third microphone signals and generating a first vector signal corresponding to the angular position of the target vehicle with respect to said first microphone array, said first microphone array having a predetermined spatial orientation and providing said first vector signal as output;

a second microphone array comprised of a fourth microphone for generating a fourth microphone signal corresponding to received sound, a fifth microphone, offset from said fourth microphone and located a predetermined distance from said fourth microphone for generating a fifth microphone signal corresponding to received sound, a sixth microphone offset from said fourth microphone and generally opposite said fifth microphone located a known distance from said fourth microphone for generating a sixth microphone signal corresponding to received sound, the geometric relationship of said fourth, fifth and sixth microphone substantially defining a right triangle with said fourth microphone located at the vertex of the right angle and the plane of the triangle being generally parallel to the ground, and second circuitry means for comparing said fourth microphone signal to each of said fifth said sixth microphone signals and generating a second vector signal corresponding to the angular position of the target position of the target vehicle with respect to said second microphone array, said second microphone array spaced a predetermined distance from said first microphone array and having a known spatial orientation as said first microphone array and providing said second vector as output, wherein each of said first and second circuitry means further comprises;

timing means for providing a time frame of reference for signal analysis;

at least one zero crossing detector means for detecting the zero crossings of said microphone signals and generating a step signal at each detected zero crossings corresponding to each of said microphone signals having as input each of said microphone signals and having as output first, second and third step signals;

time differential detection means for comparing said first step signal to said second step signal with respect to said time frame of reference and generating a first time differential signal corresponding to the time interval between said first step signal and said second step signal and comparing said first step signal to said third step signal and generating a second time differential signal corresponding to the time interval between said first step signal and said third step signal, having as input said first, second and third step signals and having as output said first and second time differential signals; and angular measurement means having as input said first and second time differential signals for determining the angular position of said target vehicle with respect to said first or second microphone array based upon said first and second time differential signals and the geometry of said microphone array and generating either said first vector signal or second vector signal; and processing means having as input said first and second vector signals for analyzing said first and second vector signals and determining the spatial position of the target vehicle and for storing the spatial position of the target vehicle at predetermined time intervals and generating a record of the operations of said target vehicle in order to track the movement of said vehicle.

23. The apparatus of claim 22 wherein each of said microphone arrays is further comprised of:

a seventh microphone for generating a seventh microphone signal corresponding to received sound, located above the plane defined by said first, second and third microphones and such that said seventh, first and second and said seventh, first and third microphones each substantially define a right triangle having said first microphone located at the right angle thereof; and an eighth microphone for generating an eighth microphone signal corresponding to received sound located above the plane defined by said fourth, fifth and sixth microphones and such that said eighth, fourth and fifth and eighth, fourth and sixth microphones each substantially define a right triangle having said fourth microphone located at the right angle thereof; and said circuitry means adapted to further compare said first and seventh microphone signals and said eighth and fourth microphone signals in determining said plurality of parameters.

* * * * *

UNITED STATES PATENT AND TRADEMARK OFFICE
CERTIFICATE OF CORRECTION

PATENT NO. : 5,189,425
DATED : February 23, 1992
INVENTOR(S) : John W.T. Dabbs

It is certified that error appears in the above-identified patent and that said Letters Patent is hereby corrected as shown below:

column 8, line 63, after focal point delete "1" and insert -- 18 --;

column 10, line 8, after "of," delete ".";

column 13, line 52, after "74" delete "ma" and insert -- may --;

column 17, line 34, after "signals" delete ":" and insert -- ; --;

column 18, line 35, after "propagating", delete "under" and insert -- radar --;

column 21, line 47, after "zero crossing" delete "s"; and column 22, line 44, after " and " insert -- said --.

Signed and Sealed this

Thirtieth Day of November, 1993

Attest:

BRUCE LEHMAN

Attesting Officer

Commissioner of Patents and Trademarks